(12) United States Patent
Mullen et al.

(10) Patent No.: US 10,817,331 B2
(45) Date of Patent: Oct. 27, 2020

(54) EXECUTION OF AUXILIARY FUNCTIONS IN AN ON-DEMAND NETWORK CODE EXECUTION SYSTEM

(71) Applicant: Amazon Technologies, Inc., Seattle, WA (US)

(72) Inventors: Niall Mullen, Seattle, WA (US); Philip Daniel Piwonka, Seattle, WA (US); Timothy Allen Wagner, Seattle, WA (US); Marc John Brooker, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 127 days.

(21) Appl. No.: 16/017,970

(22) Filed: Jun. 25, 2018

(65) Prior Publication Data
US 2019/0391841 A1    Dec. 26, 2019

(51) Int. Cl.
*G06F 9/46* (2006.01)
*G06F 9/48* (2006.01)

(52) U.S. Cl.
CPC .................. *G06F 9/485* (2013.01)

(58) Field of Classification Search
CPC ....................................................... G06F 9/485
USPC ............................................................ 718/1
See application file for complete search history.

(56) References Cited

U.S. PATENT DOCUMENTS

| | | | |
|---|---|---|---|
| 8,667,471 B2 | 3/2014 | Wintergerst et al. | |
| 9,811,363 B1 * | 11/2017 | Wagner | G06F 9/44521 |
| 10,002,026 B1 | 6/2018 | Wagner | |
| 2008/0244547 A1 | 10/2008 | Wintergerst et al. | |
| 2011/0099204 A1 | 4/2011 | Thaler | |
| 2013/0132953 A1 | 5/2013 | Chuang et al. | |

(Continued)

FOREIGN PATENT DOCUMENTS

| | | |
|---|---|---|
| WO | WO 2018/098445 A1 | 5/2018 |
| WO | WO 2020/005764 A1 | 1/2020 |

OTHER PUBLICATIONS

Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.

(Continued)

*Primary Examiner* — Camquy Truong
(74) *Attorney, Agent, or Firm* — Knobbe Martens Olson & Bear LLP

(57) ABSTRACT

Systems and methods are described for providing auxiliary functions in an on-demand code execution system in a manner that enables efficient execution of code. A user may generate a task on the system by submitting code. The system may determine the auxiliary functions that the submitted code may require when executed on the system, and may provide these auxiliary functions by provisioning sidecar virtual machine instances that work in conjunction with the virtual machine instance executing the submitted code. The sidecars may provide auxiliary functions on a per-task, per-user, or per-request basis, and the lifecycles of the sidecars may be determined based on the lifecycles of the virtual machine instances that execute submitted code. Auxiliary functions may thus be provided only when needed, and may be provided securely by preventing a user from accessing the sidecars of other users.

19 Claims, 8 Drawing Sheets

(56) References Cited

U.S. PATENT DOCUMENTS

| | | |
|---|---|---|
| 2013/0167147 A1 | 6/2013 | Corrie et al. |
| 2014/0201735 A1 | 7/2014 | Kannan et al. |
| 2014/0372533 A1 | 12/2014 | Fu et al. |
| 2015/0074662 A1* | 3/2015 | Saladi .................... G06F 30/33 718/1 |
| 2015/0143381 A1 | 5/2015 | Chin et al. |
| 2015/0324182 A1 | 11/2015 | Barros et al. |
| 2016/0224785 A1 | 8/2016 | Wagner et al. |
| 2017/0286187 A1* | 10/2017 | Chen ......................... G06F 9/50 |
| 2017/0371703 A1 | 12/2017 | Wagner et al. |
| 2018/0150339 A1 | 5/2018 | Pan et al. |

OTHER PUBLICATIONS

International Search Report for Application No. PCT/US2019/038520 dated Aug. 14, 2019.

* cited by examiner

EXECUTION OF AUXILIARY FUNCTIONS IN AN ON-DEMAND NETWORK CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
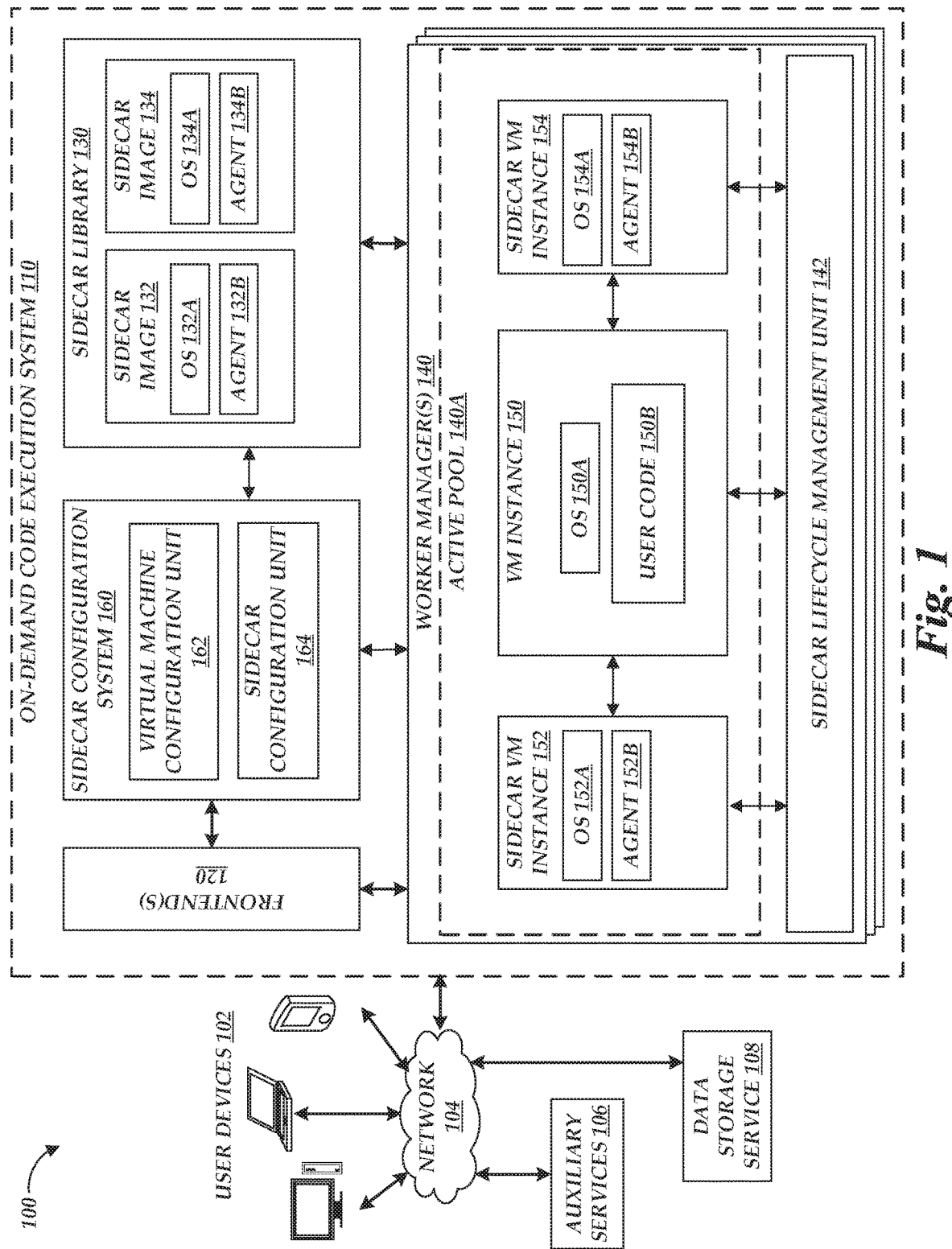
FIG. 1 is a block diagram depicting an illustrative environment in which an on-demand code execution system can operate to execute tasks corresponding to code, which may be submitted by users of the on-demand code execution system, and to provision and execute sidecar virtual machine instances to facilitate execution of the submitted code.

Generally described, aspects of the present disclosure relate to an on-demand code execution system. The on-demand code execution system enables rapid execution of code, which may be supplied by users of the on-demand code execution system. More specifically, embodiments of the present disclosure relate to implementing auxiliary functions for an on-demand code execution system through the use of "sidecar" virtual machine instances. As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

The on-demand code execution system may instantiate virtual machine instances to execute the specified tasks on demand. The on-demand code execution system may further instantiate "sidecar" virtual machine instances, which enable users to control or monitor the execution of a task and the virtual machine instance upon which it executes. Illustratively, a sidecar virtual machine instance (which may be referred to herein as a "sidecar") may implement one or more functions for controlling, securing, filtering, monitoring, or managing the virtual machine instance that executes the task code. By implementing these functions in a sidecar or sidecars, the on-demand code execution system can effectively separate these functions from the virtual machine instances executing task code. The sidecar implementation thus improves efficiency with regard to resource utilization, since (as described in more detail below) the sidecars can be made available only when needed. The sidecar implementation further improves security for individual users, since an attacker who compromises one sidecar does not gain access to the sidecars or virtual machine instances of other users.

As used herein, "auxiliary functions" may refer generally to functions that facilitate the execution of user-submitted task code. For example, auxiliary functions may include encapsulation, logging, tracing, debugging, scanning, profiling, validating input, validating output, or other functions that relate to task code execution. It will be understood by one skilled in the art, however, that these examples are not limiting and that sidecars performing other functions are within the scope of the present disclosure. In some embodiments, auxiliary functions may include control plane functions that execute with administrator-level privileges. Sidecars may be instantiated to perform these functions on a per-user, per-task, or per-call basis, and may thus provide individual users with access to individualized control planes for their virtual machine instances. For example, a sidecar that encapsulates network traffic may be made available to individual users, and may translate packets that are transported on a physical substrate network to a virtual network that the user can access from the user's virtual machine instance. The on-demand code execution system can thus provide network encapsulation via a sidecar, and can do so without allowing a virtual machine instance that runs user code to access the substrate network and potentially de-encapsulate the traffic of other users.

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, the limited nature of computing resources with which to execute code, the resource overhead associated with providing "always-on" auxiliary functionality, the inefficiencies caused by provisioning functionality that is not utilized, and the security issues caused by providing a common control plane to multiple users. These technical problems are addressed by the various technical solutions described herein, including the provisioning of an execution environment with sidecar virtual machine instances that provide user-specific or task-specific functionality. Thus, the present disclosure represents an improvement on existing data processing systems and computing systems in general.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance, and provisioning the containers with code of the task as well as an dependency code objects. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreci- FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programing interfaces (APIs), and/or other programmatic interfaces for generating and uploading user-executable code (e.g., including metadata identifying dependency code objects for the uploaded code), invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. For example, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, and as described in more detail below, the on-demand code execution system 110 may configure the virtual machine instances with customized operating systems to execute the user's code more efficiency and reduce utilization of computing resources.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To facilitate execution of tasks, the on-demand code execution system 110 includes one or more sidecar libraries 130, which in turn include one or more sidecar images. In the example illustrated in FIG. 1, the sidecar library 130 includes a sidecar image 132, which comprises an operating system 132A and an agent 132B, and a sidecar image 134, which comprises an operating system 134A and an agent 134B. In some embodiments, the operating system 132A and the operating system 134A may be the same operating system. As described in more detail below, the agents 132B and 134B may perform one or more auxiliary functions when configured to communicate with a virtual machine instance or instances. In some embodiments, the sidecar library 130 contains only agents that perform auxiliary functions (e.g., agents 132B and 134B), and a sidecar is created by provisioning a virtual machine instance with one or more of the agents from the sidecar library 130.

The on-demand code execution system 110 further includes a sidecar configuration system 160, which implements aspects of the present disclosure including, for example, the determination and configuration of virtual machine instances and sidecar instances for a particular task. In some embodiments, the sidecar configuration system 160 includes a virtual machine configuration unit 162, which may be invoked when the user submits code via the frontend 120 to determine a virtual machine configuration to use with the submitted code. As described in more detail below, the virtual machine configuration unit 162 may analyze the user's code and identify, for example, operating system "hooks," input and/or output redirections, or other modifications to facilitate interactions between a virtual machine instance and various sidecars before, during, and/or after execution of the user-submitted code. In various embodiments, the virtual machine configuration unit 162 may analyze the user's code or process user requests to determine a virtual machine configuration. In further embodiments, the on-demand code execution system 110 includes a sidecar configuration unit 164, which may identify the sidecars to be provisioned along with any configuration of the sidecars to facilitate interaction with the virtual machine instance(s). The sidecar configuration unit 164 may identify, for example, input validations that a sidecar should perform, and may configure a sidecar to perform them. For example, the user-submitted code may process input data in a particular format, and a thus a sidecar configuration may be determined to validate that the input data is in the format.

The on-demand code execution system further includes one or more worker managers 140 that manage the instances used for servicing incoming calls to execute tasks, and that manage the sidecars used to provide auxiliary functions for these instances. In the example illustrated in FIG. 1, each worker manager 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art. In accordance with embodiments of the present disclosure, the worker manager 140 can obtain a virtual machine configuration and/or sidecar configurations when provisioning a virtual machine instance.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the virtual machine instance 150. The instance 150 includes an operating system 150A and user code 150B. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool (e.g., including the number and type of instances). In other embodiments, the worker managers 140 requests compute capacity from a warming pool manager without having knowledge of the virtual machine instances in a warming pool.

The active pool 140A may further include one or more sidecar virtual machine instances, such as sidecar 152 and sidecar 154. As depicted in FIG. 1, the sidecar 152 includes an OS 152A and an agent 152B, and the sidecar 154 includes an OS 154A and an agent 154B. In some embodiments, one or both of the sidecars 152 and 154 may correspond to a provisioned instance of a sidecar image 132 or 134 from the sidecar library 130. The sidecars 152 and 154 may, as described in more detail below, provide one or more auxiliary functions in conjunction with the virtual machine instance 150 that executes user code 150B.

The worker manager 140 may further include a sidecar lifecycle management unit 142. As described in more detail below, the sidecar lifecycle management unit 142 may monitor the lifecycles of virtual machine instances, such as virtual machine instance 150, and may ensure that the lifecycles of corresponding sidecar instances (e.g., sidecars 152 and 154) are synchronized with the virtual machine instance(s) to which they are attached. As described below, the sidecar lifecycle management unit 142 may determine whether a particular sidecar should precede, follow, or change its execution state in parallel when a virtual machine instance undergoes a change in execution state, and may cause sidecars to implement changes in execution state accordingly. In some embodiments, the sidecar lifecycle management unit 142 may be a component of the active pool 140A. In other embodiments, the sidecar lifecycle management unit 142 may sit outside the active pool 140A and facilitate the addition, removal, and/or the timing of the addition or removal of sidecars from the active pool 140A.

While some functionalities are generally described herein with reference to an individual component of the on-demand code execution system 110, other components or a combination of components may additionally or alternatively implement such functionalities. For example, a worker manager 140 may operate to configure virtual machine instances in a manner similar or identical to as described herein with reference to an OS configuration system 160. One skilled in the art will also understand that the present disclosure is not limited to the embodiment depicted in FIG. 1, in which one virtual machine instance 150 is in communication with two sidecars 152 and 154. In various embodiments, any number of sidecars may be in communication with any number of virtual machine instances, including one-to-many and many-to-many relationships between virtual machine instances and sidecars.

Figure 2:
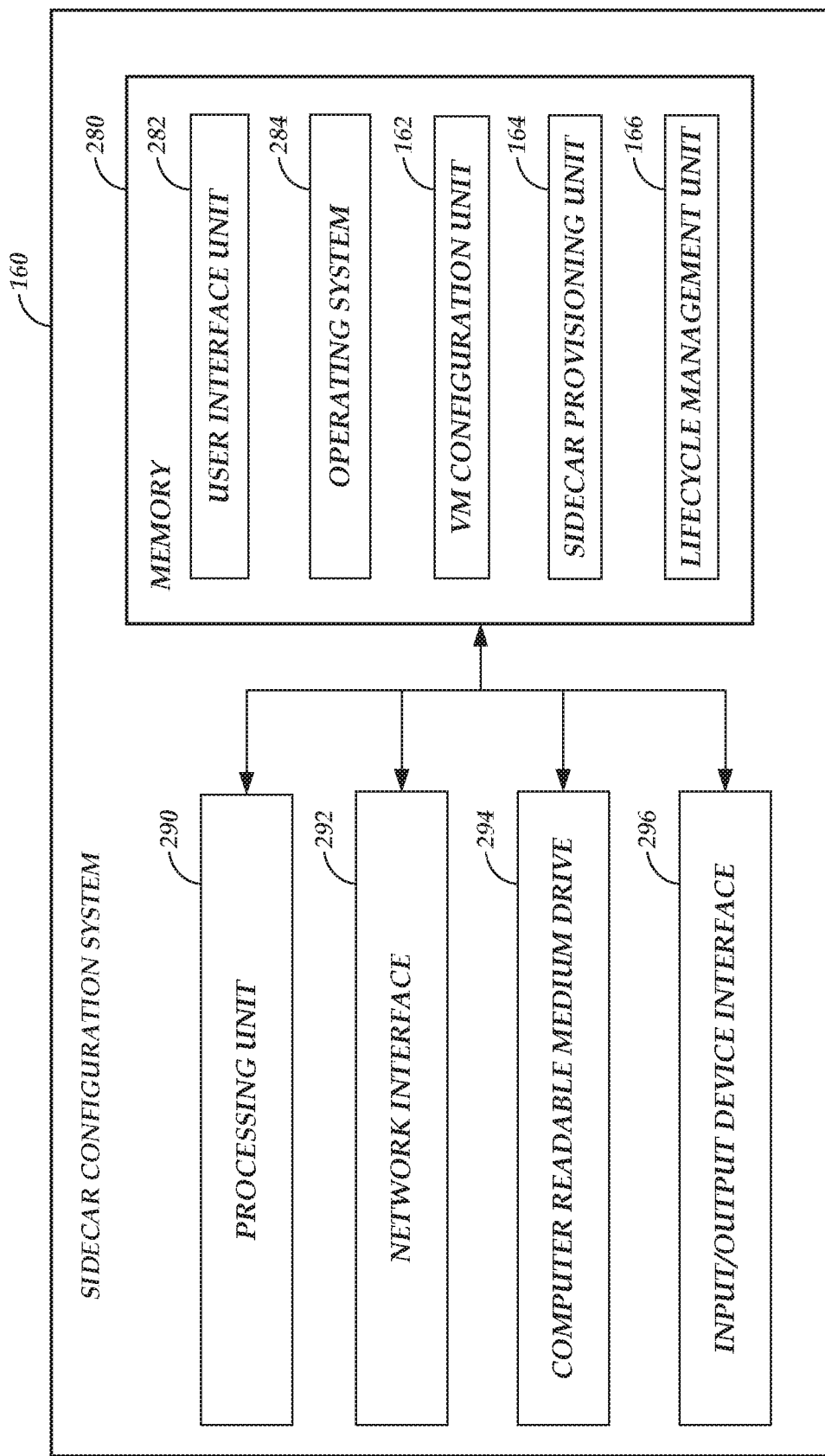
FIG. 2 depicts a general architecture of a computing device providing a sidecar configuration system that is configured to facilitate configuration of sidecar virtual machine instances used to facilitate execution of tasks on the on-demand code execution system of FIG. 1.

FIG. 2 depicts a general architecture of a computing system (referenced as sidecar configuration system 160) that operates to determine sidecar configurations within the on-demand code execution system 110. The general architecture of the sidecar configuration system 160 depicted in FIG. 2 includes an arrangement of computer hardware and software modules that may be used to implement aspects of the present disclosure. The hardware modules may be implemented with physical electronic devices, as discussed in greater detail below. The sidecar configuration system 160 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the sidecar configuration system 160 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the sidecar configuration system 160. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data repositories (not shown), for example, to access user program codes and/or libraries.

In addition to and/or in combination with the user interface unit 282, the memory 280 may include a virtual machine configuration unit 162 and a sidecar configuration unit 164 that may be executed by the processing unit 290. In one embodiment, the virtual machine configuration unit 162 and the sidecar configuration unit 164 individually or collectively implement various aspects of the present disclosure, e.g., generating or selecting sidecar configurations within the on-demand code execution system 110, determining virtual machine configurations, etc., as described further below.

While the virtual machine configuration unit 162 and the sidecar configuration unit 164 are shown in FIG. 2 as part of the sidecar configuration system 160, in other embodiments, all or a portion of the virtual machine configuration unit 162 and the sidecar configuration unit 164 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the sidecar configuration system 160.

In some embodiments, the sidecar configuration system 160 may further include components other than those illustrated in FIG. 2. For example, the memory 280 may further include an instance allocation unit for allocating execution environments to tasks, user code execution unit to facilitate execution of tasks within the execution environments, or a container manager for managing creation, preparation, and configuration of containers within virtual machine instances.

Figure 3:
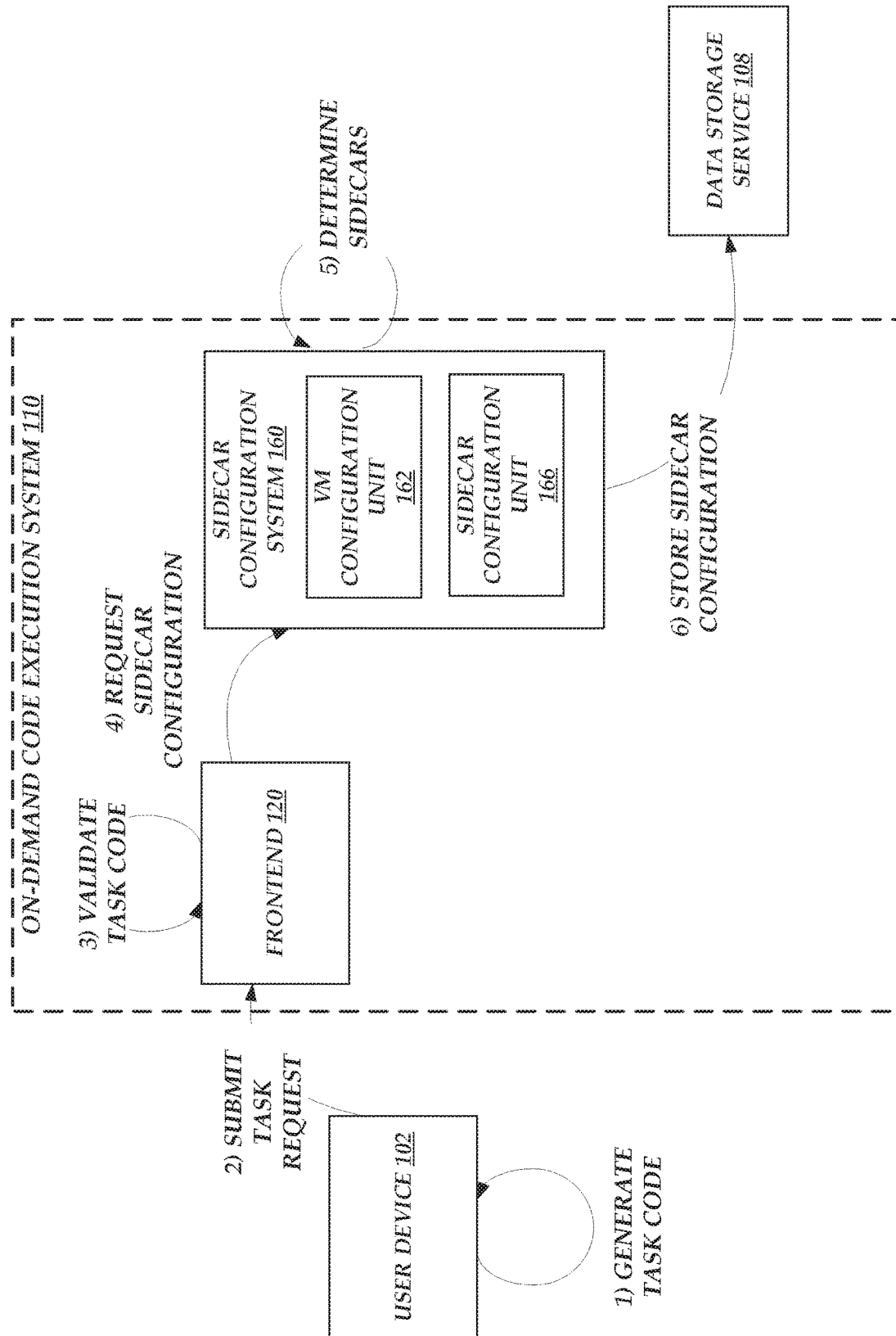
FIG. 3 is a flow diagram depicting illustrative interactions for submitting code corresponding to a task to the on-demand code execution system of FIG. 1, and for the on-demand code execution system to determine sidecar configurations to facilitate execution of the task on the on-demand code execution system.

With reference to FIG. 3, illustrative interactions are depicted for determining and configuring the sidecars for an execution of user-submitted code. The interactions of FIG. 3 begin at (1), where a user device 102 may generate a request to execute task code on an on-demand code execution system 110. Illustratively, the user may generate code whose execution requires various auxiliary functions, and thus requires a sidecar or sidecars that provide these functions. In some embodiments, the user may generate or identify a list of auxiliary functions that the user expects to require during execution of the task code. At (2), the user device 102 submits the request to the frontend 120, such as by using a API or other interface of the frontend 120. The request may include, for example, the task code and a list of sidecars or auxiliary functions. At (3), the frontend 120 validates the submitted task code. Validation can include, for example, verifying that the task code can be executed by the on-demand code execution system 110.

At (4), the frontend 120 transmits a request to the sidecar configuration system 160 to determine a set of sidecars for the task. Thereafter, at (5), the sidecar configuration system 160 determines a suitable set of sidecars. Illustratively, the virtual machine configuration unit 162 of the sidecar configuration system 160 may analyze the reqeust to identify a set of sidecar virtual machine instances that will facilitate executing the task code. The sidecar configuration unit 164 may then configure the virtual machine instance and the sidecars that will be needed during task code execution. For example, the sidecar configuration system 160 may determine that the task code will require input validation during execution. The virtual machine configuration unit 162 may thus configure a virtual machine instance to receive processed input from a sidecar, and the sidecar configuration unit 164 may identify and configure a sidecar to perform the necessary input validation. As a further example, the sidecar configuration system 160 may determine that the user wishes to profile execution of the task code to determine whether and how the code can be optimized. The virtual machine configuration unit 162 may thus configure a virtual machine instance to output profiling data during task execution, and the sidecar configuration unit 164 may configure a sidecar that aggregates and reports the profiling data.

At (6), the sidecar configuration system may store the determined sidecar configuration, and the validated task code, in a storage device such as the data storage device 108. The on-demand code execution system 110 may thus reduce the time spent analyzing code and determining sidecar configurations when receiving further requests to execute the task code, as discussed in more detail below. In some embodiments, the on-demand code execution system 110 may determine sidecars on a per-request basis. For example, the request may contain a debugging flag or other information that indicates whether to include a particular sidecar when executing the task code.

In some embodiments, the ordering and implementation of operations described above may be modified, or these interactions may be carried out by additional or alternative elements of the on-demand code execution system 110. For example, in one embodiment, the virtual machine configuration unit 162 and the sidecar configuration unit 164 may be combined, and the determinations made by these units may be collectively considered a "sidecar configuration" that includes configuration of the virtual machine that executes the task code. As a further example, in another embodiment, the user device 102 may request a particular sidecar configuration for the submitted task code, and the sidecar configuration system 160 may validate, process, and/or implement this request.

Figure 4:
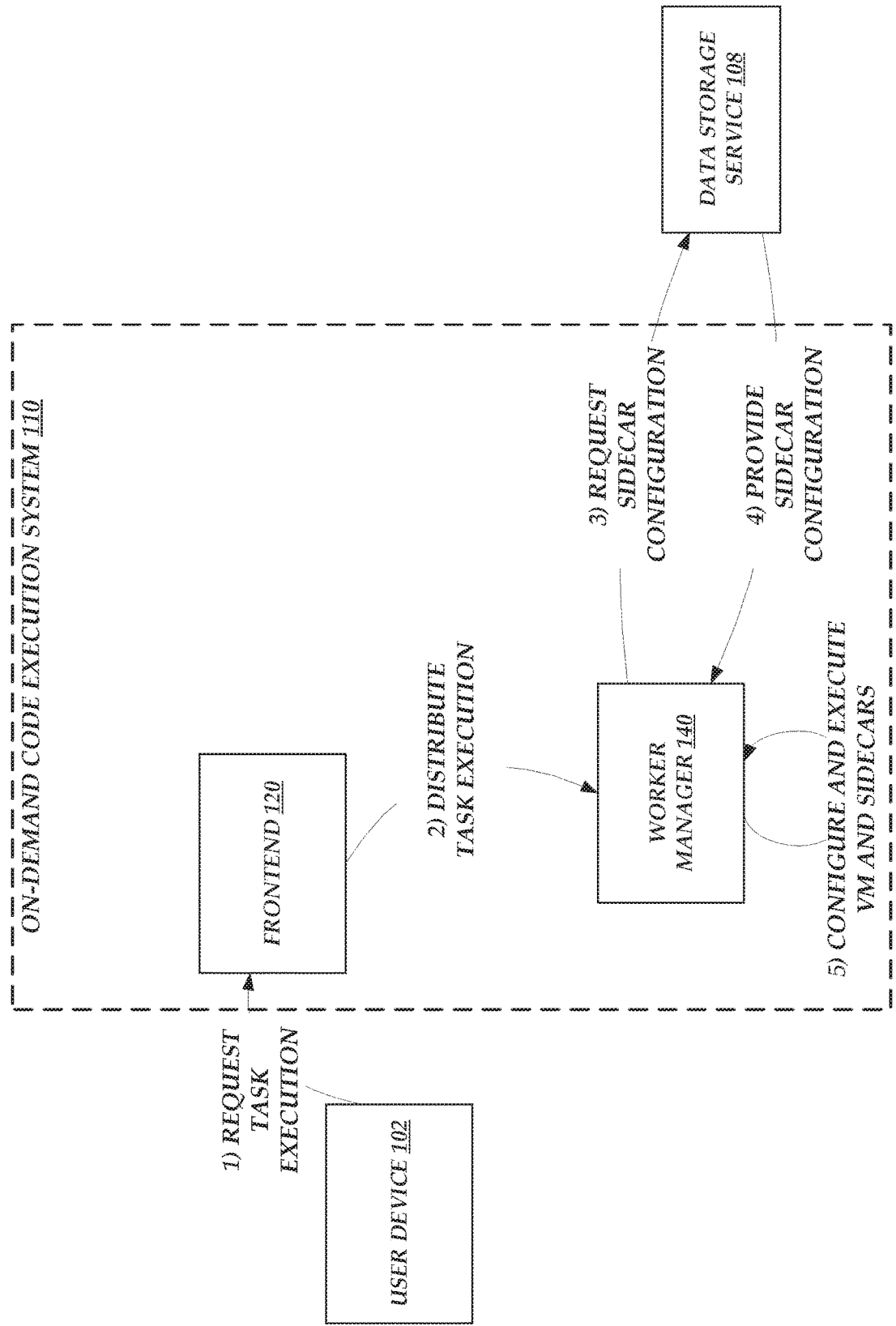
FIG. 4 is a flow diagram depicting illustrative interactions for executing a task utilizing the determined sidecar configuration provided on the on-demand code execution system of FIG. 1.

Illustrative interactions for utilizing a predetermined sidecar configuration in conjunction with executing tasks on the on-demand code execution system 110 will be described with reference to FIG. 4. At (1), the user device 102 may request task execution. In some embodiments, as described above, the frontend 120 may initiate task execution without receiving a request, in which case the interaction at (1) may be omitted.

At (2), the frontend 120 distributes the task for execution to the worker manager 140. Prior to distributing the task execution, the frontend 120 may undertake any of a number of additional interactions, such as queuing the request, validating the request, etc., as described in more detail within the '556 Patent, incorporated by reference above.

At (3), the worker manager 140 requests a sidecar configuration for the task. In some embodiments, as described above, a sidecar configuration may be determined when the code of the task is submitted for validation (e.g., by carrying out the interactions illustrated in FIG. 3). In other embodiments, a sidecar configuration may be provided by the user when the code of the task is submitted for validation. In further embodiments, a sidecar configuration may be determined on a per-request basis. At (4), the worker manager 140 receives the previously determined (or previously specified) sidecar configuration from the data storage device 108.

Thereafter, at (5), the worker manager 140 configures and executes a virtual machine instance and sidecars in accordance with the received sidecar configuration. In some embodiments, as described above, the worker manager 140 may obtain sidecar images from a library, such as the sidecar library 130 of FIG. 1, and configure these images in accordance with the configuration. In other embodiments, the worker manager 140 may obtain fully or partially preconfigured sidecars from a warming pool, and may perform additional configurations as needed (e.g., to cause the sidecar to communicate with a particular virtual machine instance). In still further embodiments, the worker manager 140 may obtain multiple virtual machine instances from a warming pool, and may configure some of the instances to execute task code and configure other instances to be sidecars (e.g., by provisioning the sidecar instances with agents that perform auxiliary functions).

Illustrative interactions for managing the lifecycles of sidecars in conjunction with the lifecycle of a "main" virtual machine instance (e.g., one that executes task code) will be described with reference to FIG. 5. At (1), the sidecar lifecycle management unit 142 monitors the execution of the virtual machine instance 150. Illustratively, the sidecar lifecycle management unit 142 may monitor inputs, outputs, resource utilization, metrics generated by the virtual machine instance 150, metrics generated by the worker manager 140, or other information relating to the status of the virtual machine instance 150.

At (2), the sidecar lifecycle management unit 142 detects that the virtual machine instance 150 is about to undergo a change in execution state. Changes in execution state may include, for example, provisioning the virtual machine instance 150, starting execution of the task code, suspending execution of the task code, resuming execution of the task code, terminating execution of the task code, suspending the virtual machine instance 150, resuming the virtual machine instance 150, deprovisioning the virtual machine instance 150, and the like. Terminating execution of the task code may include both normal termination (e.g., the task code executing to completion) and abnormal termination (e.g., the task code halting execution due to an error, because the user requested termination, because a signal was received from the operating system, etc.). In some embodiments, the sidecar lifecycle management unit 142 detects a pending change in execution state prior to its occurrence. For example, the sidecar lifecycle management unit 142 may receive a notification that the worker manager 140 is provisioning, or is about to provision, the virtual machine instance 150. In other embodiments, the sidecar lifecycle management unit 142 may detect the change while or after it occurs. For example, the sidecar lifecycle management unit 142 may detect that the virtual machine instance has suspended or terminated execution of the task code because the task code has processed all of the available input data, because a threshold amount of computing resources has been consumed, or because the task code has exited with an error message.

Thereafter, at (3), the sidecar lifecycle management unit 142 determines what changes should occur to the execution states of sidecars associated with the virtual machine instance 150, such as sidecars 152 and 154. The changes in execution states for the sidecars may be determined based on multiple factors, such as the number of virtual machine instances associated with the sidecar, the auxiliary function(s) performed by the sidecar, and so forth. For example, the sidecar 152 may provide output validation for the virtual machine instance 150. The sidecar lifecycle management unit 142 may therefore determine that the sidecar 152 can enter an inactive state when the virtual machine instance 150 enters an inactive state, since the output validation function will not be required. As another example, the sidecar 154 may provide control plane functions to both the virtual machine instance 150 and another virtual machine instance, which may execute the same task code or different task code on behalf of the same user. The sidecar lifecycle management unit 142 may thus determine that the sidecar 154 should only be deprovisioned if both of the virtual machine instances it supports have entered a deprovisioned state.

In some embodiments, the sidecar lifecycle management unit 142 may determine an order in which sidecar(s) and the virtual machine instance 150 should change their execution states, and may cause the execution states to change in the determined order. For example, the sidecar 154 may provide logging or debugging functions for the virtual machine instance 150. The sidecar lifecycle management unit 142 may thus determine that the sidecar 154 should enter a suspended execution state only after the virtual machine instance 150 does so, and should resume execution before the virtual machine instance 150 does so, in order to permit the sidecar 154 to maintain a complete record of logging or debugging information. As another example, the sidecar 152 may process and validate input data before sending it to the virtual machine instance 150, and thus the virtual machine instance 150 must be active before the sidecar 152 begins sending data to it. In some embodiments, the sidecar lifecycle management unit 142 may not have control over the timing of changes in the execution state of the virtual machine instance 150, and may thus schedule and prioritize changes to sidecar execution states based on the timing of changes in the execution state of the virtual machine instance 150.

Figure 5:
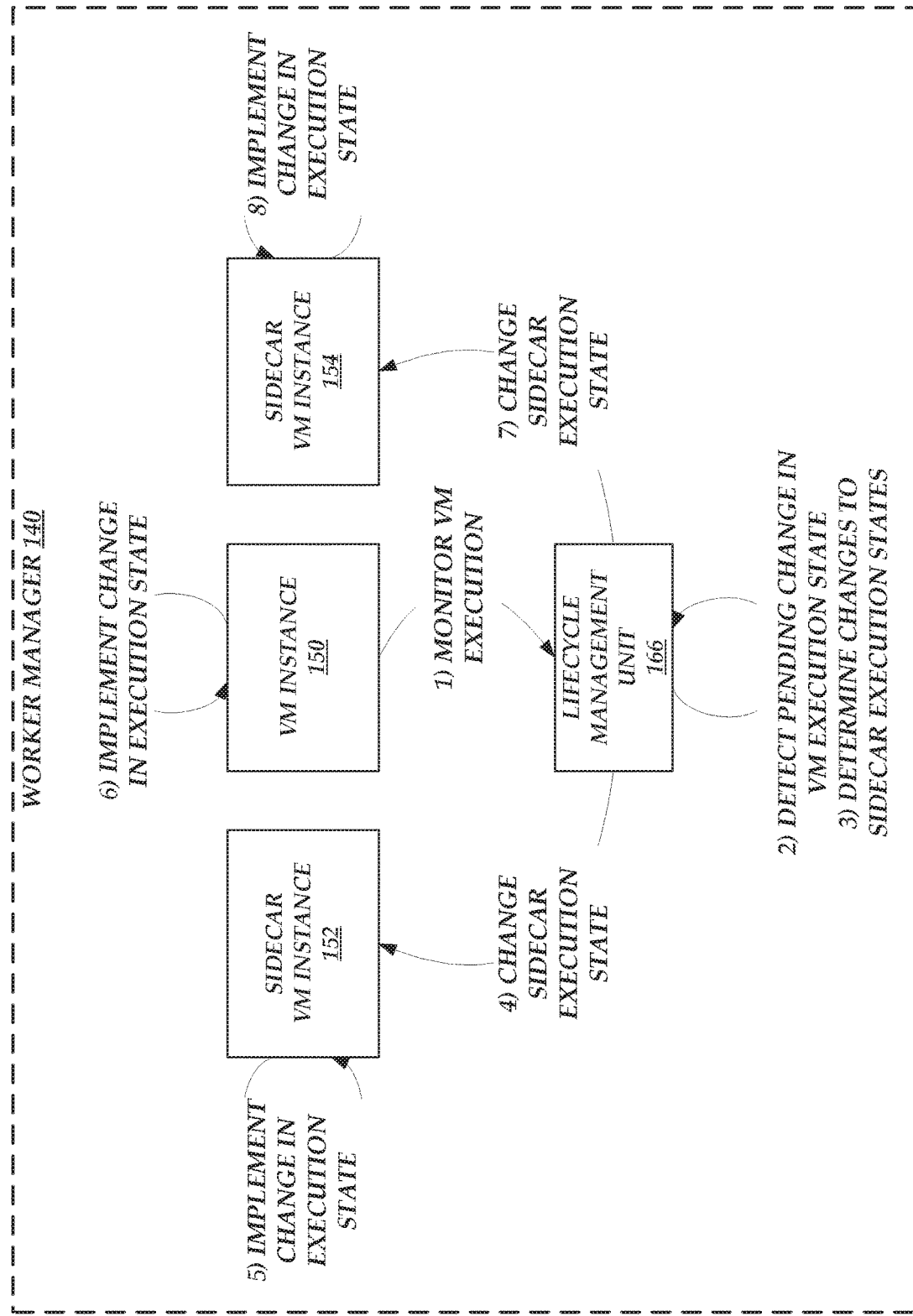
FIG. 5 is a flow diagram depicting illustrative interactions for managing the lifecycles of sidecar virtual machine instances on the on-demand code execution system of FIG. 1.

In the example illustrated in FIG. 5, the sidecar lifecycle management unit 142 determines that a change in the execution state of the sidecar 152 should precede the change in the execution state of the virtual machine instance 150, and that a change in the execution state of the sidecar 154 should follow the change to the virtual machine instance 150. The sidecar lifecycle management unit 142 therefore, at (4), causes the sidecar 152 to change its execution state. In various embodiments, the sidecar lifecycle management unit 142 may cause the change in execution state by sending instructions to the sidecar 152, the worker manager 140, or another component of the on-demand code execution system 110. At (5), the sidecar 152 (or another component) implements the change in execution state.

Thereafter, at (6), the virtual machine instance 150 implements its change in execution state. In some embodiments, the worker manager 140 implements the change in the virtual machine instance 150 execution state, for example by provisioning or deprovisioning the virtual machine instance 150. In other embodiments, the virtual machine instance 150 may implement the change. For example, the virtual machine instance 150 may begin, end, suspend, or resume execution of the task code.

At (7), the sidecar lifecycle management unit 142 causes a change in the execution state of the sidecar 154, in similar fashion to the interaction at (4). Thereafter, at (8), the sidecar 154 (or another component of the on-demand code execution system 110) implements the change in execution state for the sidecar 154.

In some embodiments, one or more of the interactions at (4), (6), and (7) may be consolidated into a single interaction. For example, the sidecar lifecycle management unit 142 may provide the worker manager 140 with a schedule or an ordered list for changing the execution states of the sidecar 152, virtual machine instance 150, and sidecar 154, and the worker manager 140 may implement the execution state changes in the indicated order. As another example, the sidecar lifecycle management unit 142 may indicate to the worker manager 140 that the sidecar 152 should resume execution prior to the virtual machine instance 150, and the sidecar 154 should resume after the virtual machine instance 150 resumes execution. Additionally, as discussed above, in some embodiments the interaction at (2) may detect a change that is occurring or has already occurred, rather than detecting a change that is about to occur.

Figure 6:
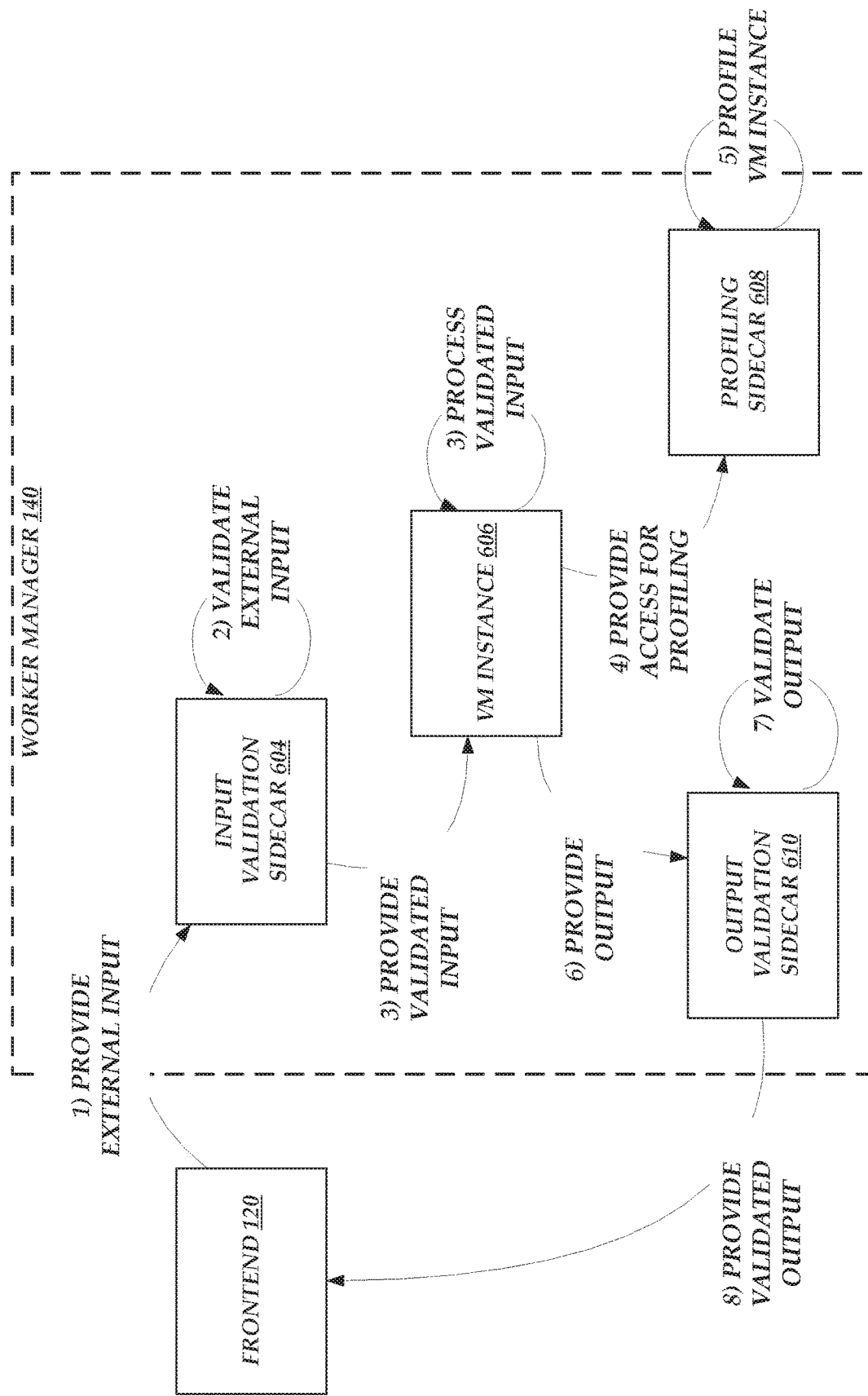
FIG. 6 is a flow diagram depicting illustrative interactions between sidecar virtual machine instances and virtual machine instances that execute code corresponding to tasks on the on-demand code execution system of FIG. 1.

FIG. 6 depicts an illustrative example of interactions between a virtual machine instance 604 and sidecars 606, 608, and 610. In the illustrated example, at (1), external input is provided to an input validation sidecar 606. The external input may be received from the frontend 120, or in some embodiments from another input source. At (2), the input validation sidecar 606 may validate the external input. For example, the input validation sidecar 606 may sanitize the external input (e.g., by inserting escape characters or removing special characters) or verify that the external input is in a format expected by the task code.

Thereafter, at (3), the input validation sidecar 606 may provide validated input to the virtual machine instance 604. In some embodiments, the virtual machine instance 604 may be configured to receive input from the input validation sidecar 606. In other embodiments, the sidecar 606 may be configured to transmit processed input to the virtual machine instance 604, and no special configuration is performed on the virtual machine instance 604: Instead, the task code executing on the virtual machine instance 604 simply processes any input it receives, and the configuration of only receiving input from sidecar 606 is transparent to the virtual machine instance 604. In further embodiments, neither the input validation sidecar 606 nor the virtual machine instance 604 may be configured to be aware of the other, and the communication of validated data from the sidecar 606 to the virtual machine instance 604 may be handled by the worker manager 140.

At (4), the virtual machine instance 604 may process the validated input. Illustratively, the virtual machine instance 604 may process the validated input by executing the task code with the validated input, and may generate corresponding output. The virtual machine instance 604 may also, at (5), provide access to information that allows a profiling sidecar 608 to profile the task code. For example, the virtual machine instance 604 may generate log files, metrics, stack traces, memory dumps, or other data relating to the execution of the task code. The virtual machine instance 604 may then transmit the data, provide APIs for accessing the data, allow the profiling sidecar 608 to read file systems or memory locations, or otherwise grant access to the profiling information. At (6), the profiling sidecar may obtain and/or receive the profiling information and process it to profile the virtual machine instance 604 and/or the task code executing on the virtual machine instance 604.

At (7), the virtual machine instance 604 may provide the output generated at (4) to an output validation sidecar 610, which at (8) may validate the output. For example, the output validation sidecar 610 may post-process the output, convert it to a particular format, verify that it falls within a specified range, or perform other validations.

At (9), in some embodiments, the output validation sidecar 610 may provide validated output to the frontend 120 or another component. In some embodiments, the interactions at (1)-(9) may be repeated until no further input is available or the user issues a request to stop executing the task code. Additionally, the example interactions depicted in FIG. 6 may be carried out in different orders, or more or fewer interactions may be carried out. For example, the interactions at (5) and (6) may be omitted, or may be carried out prior to (or concurrently with) the interaction at (4). As a further example, in some embodiments, the validated input produced by the input validation sidecar 606 may be provided as input to another input validation sidecar, which may perform further validations before sending the resulting data to the virtual machine instance 604. It will thus be understood by one skilled in the art that many other combinations and arrangements of sidecars are within the scope of the present disclosure.

Figure 7:
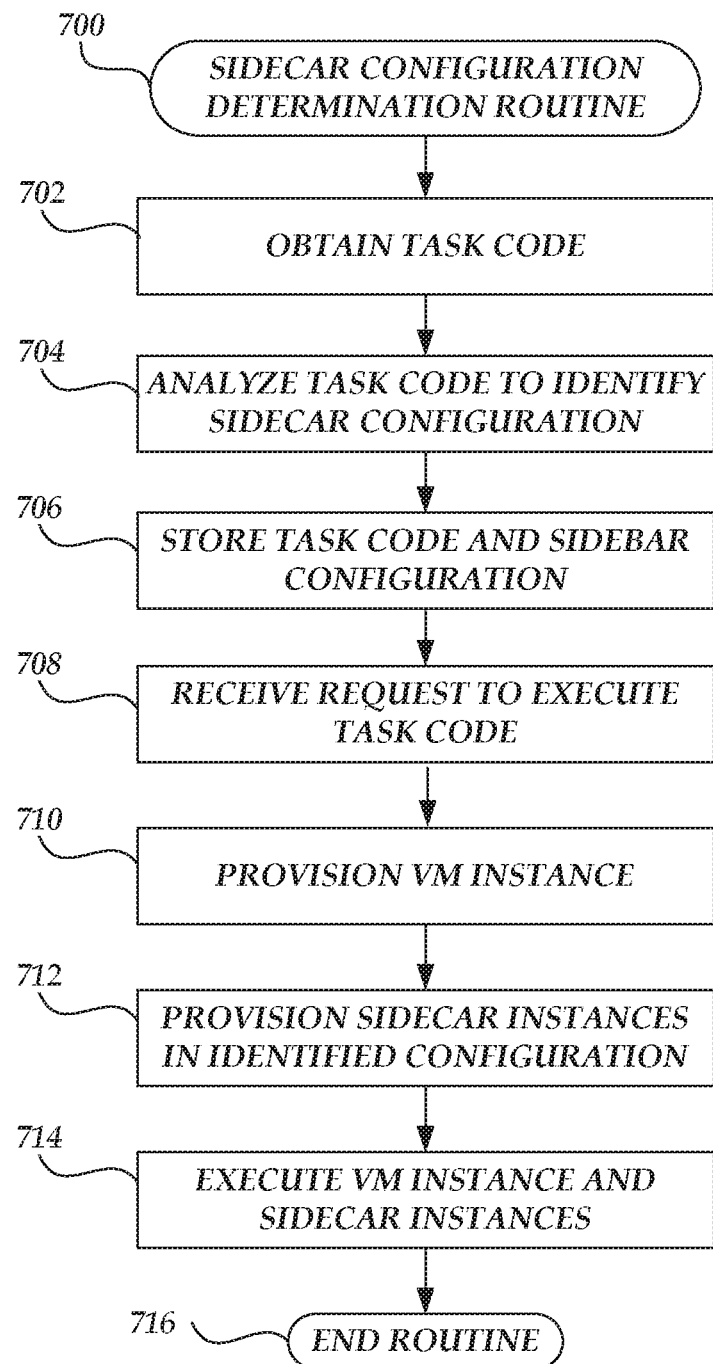
FIG. 7 is a flow chart depicting an illustrative routine for determining a sidecar configuration based on code submitted to the on-demand code execution system of FIG. 1.

With reference to FIG. 7, one illustrative routine 700 for determining a sidecar configuration for executing a task on the on-demand code execution system 110 will be described. The routine 700 may be carried out, for example, by the sidecar configuration system 160 of FIG. 1. In one embodiment, the routine 700 (e.g., blocks 702-706) is carried out in conjunction with the creation of a task on the on-demand code execution system 110. In another embodiment, all or part of the routine 700 (e.g., blocks 708-716) may be carried out in conjunction with executing the task on the on-demand code execution system 110. All or part of the routine 700 may additionally or alternatively be carried out at other times, such as periodically (e.g., once per day, week, month, etc.) or based on detection that execution metrics or resource utilization metrics fall outside a threshold.

The routine 700 begins at block 702, where the sidecar configuration system 160 obtains code for a task (e.g., as submitted by a user). In one embodiment, the code for the task is represented as a code object, such as a compressed file including source code for the task. The routine 700 then continues to block 704, where the sidecar configuration system 160 determines an sidecar configuration for the task. As described above, the sidecar configuration system 160 may, in some embodiments, determine a sidecar configuration based on the submitted task code. In other embodiments, the sidecar configuration system 160 may determine a sidecar configuration based on user input, such as a request to profile execution of the task code or validate input provided to the task code. In some embodiments, the frontend 120 or another component of the on-demand code execution system 110 may present user interfaces that enable a user to select desired sidecars.

At block 706, the sidecar configuration system 160 may store the task code and the sidecar configuration in a data store, such as the data store service 108. In some embodiments, as described above, the sidecar configuration may include a configuration of the virtual machine instance that executes the task code. In other embodiments, the sidecar configuration may include instructions utilized by the worker manager 140.

Thereafter, at block 708, a request to execute the task code may be received. The request may be received by, for example, the frontend 120, the worker manager 140, or another component of the on-demand code execution system 110. In some embodiments, as described above, the task code may be executed without receiving a request, in which case block 708 may be omitted.

At block 710, the worker manager 140 provisions a virtual machine instance to execute the task code. In some embodiments, the worker manager 140 configures the virtual machine instance in accordance with the sidecar configuration. For example, the worker manager 140 may configure the virtual machine instance to accept input from a sidecar, provide output to a sidecar, provide access to internals of the virtual machine (e.g., stack or memory contents), or otherwise configure the virtual machine instance to work with sidecars. In other embodiments, the virtual machine instance may not be configured and the interactions with sidecars may be transparent to the virtual machine instance.

At block 712, the worker manager 140 provisions one or more sidecars in accordance with the sidecar configuration. In some embodiments, as described above, the worker manager 140 obtains sidecar images or agents from a library, such as the sidecar library 130, and uses these images or agents to provision and configure the sidecars. In other embodiments, the sidecar configuration may include instructions for provisioning a sidecar to user specifications, and the worker manager 140 may carry out these instructions to provision the sidecar accordingly.

At block 714, the worker manager 140 executes the virtual machine instance and the sidecar instance(s). In some embodiments, the worker manager 140 proceeds to manage the lifecycles of the virtual machine instance and the sidecar instance(s) by carrying out a routine such as the routine 800 described below with reference to FIG. 8. In other embodiments, the routine 700 ends with the execution of the provisioned virtual machine instances and sidecar(s).

Figure 8:
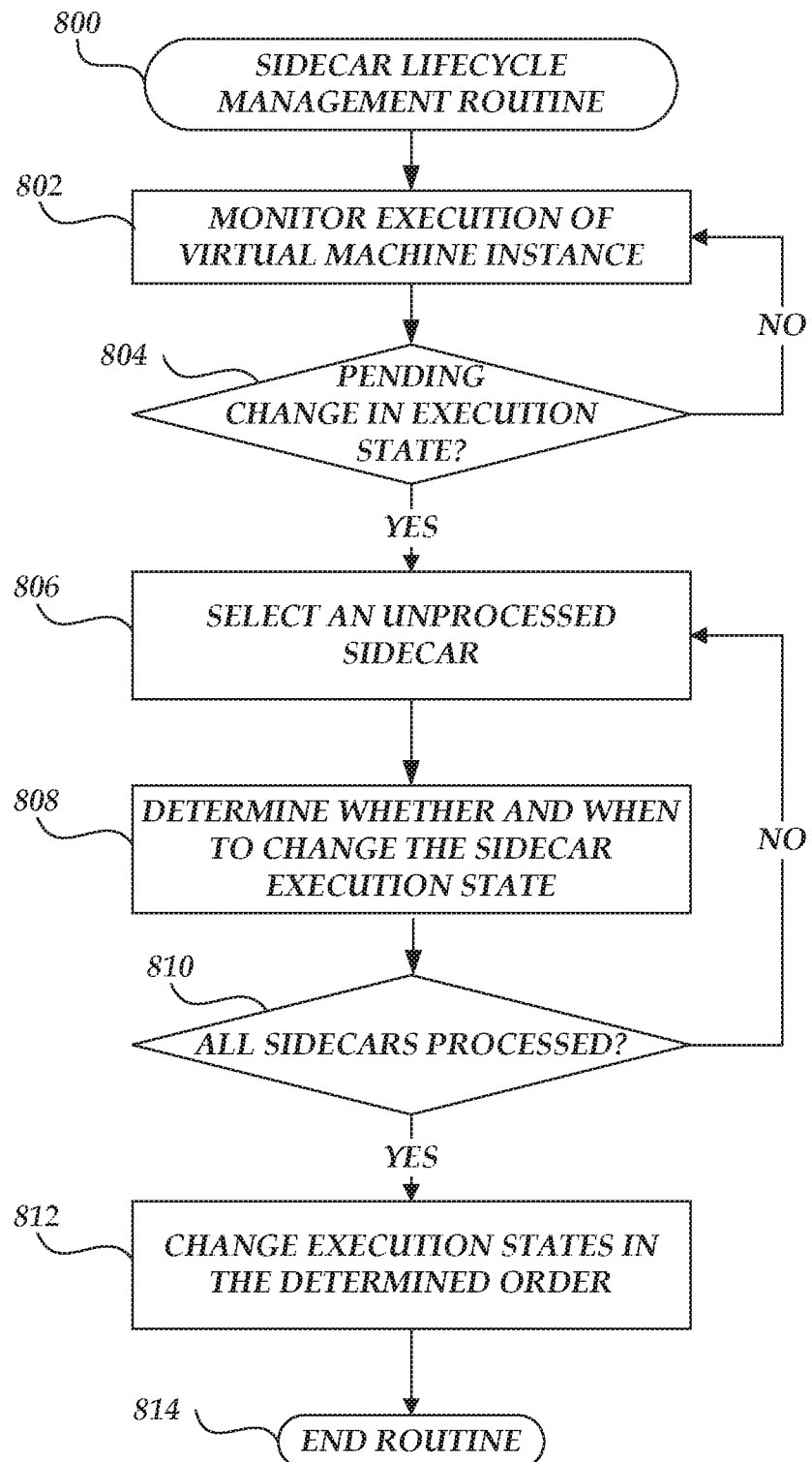
FIG. 8 is a flow chart depicting an illustrative routine for managing lifecycles of sidecars during execution of tasks on the on-demand code execution system of FIG. 1.

With reference to FIG. 8, an illustrative routine 800 for managing sidecar lifecycles will be described. The routine 800 may be carried out, for example, by the sidecar lifecycle management unit 142 of FIG. 1. The routine 800 begins at block 802, where the sidecar lifecycle management unit 142 (or, in some embodiments, the worker manager 140 or another component of the on-demand code execution system 110) monitors execution of a virtual machine instance. At decision block 804, a determination is made as to whether there is a pending change in the virtual machine instance's execution state. In some embodiments, as discussed above, the determination at decision block 804 may also include whether a change to the virtual machine instance's execution state has already occurred or is in progress. If no change in the virtual machine instance's execution state is detected, then the routine 800 branches to block 802 and continues monitoring.

If the determination at decision block 804 is that the virtual machine instance will change its execution state, then the routine 800 branches to block 806, where an unprocessed sidecar may be selected. At block 808, the sidecar lifecycle management unit 142 may determine whether the selected sidecar should change its execution state, and if so when it should change its execution state relative to the virtual machine instance. For example, the sidecar lifecycle management unit 142 may determine that the sidecar should change its execution state before, with, or after the virtual machine instance. In some embodiments, the sidecar lifecycle management unit 142 may determine a timing for the change to the selected sidecar's execution state relative to other sidecars. For example, the sidecar lifecycle management unit 142 may generate an ordered list of sidecar and virtual machine instance state changes, and may place the selected sidecar on the ordered list. In other embodiments, the sidecar lifecycle management unit 142 may determine that the selected sidecar does not require a change to its execution state, or that the selected sidecar will change to a different execution state than the virtual machine instance. For example, the sidecar lifecycle management unit 142 may determine that a sidecar should be deprovisioned after the virtual machine instance suspends execution of the task code, or that a new sidecar should be provisioned before the virtual machine instance resumes execution of the task code. In one embodiment, the sidecar lifecycle management unit 142 may ensure that a new sidecar virtual machine be created for each execution of task code within the virtual machine instance. Illustratively, where a sidecar virtual machine provides a security function, regeneration of a new sidecar for each execution of code may ensure that the function of the sidecar is not compromised, for example, by malicious data being passed to the sidecar virtual machine during a past code execution.

At decision block 810, the sidecar lifecycle management unit 142 may determine whether all of the sidecars have been processed by the routine 800. If not, the routine 800 branches to block 806, where one of the remaining unprocessed sidecars may be selected, and the routine 800 then iterates through blocks 806-810 until all sidecars have been processed. The routine 800 then branches to block 812, where the sidecar lifecycle management unit 142 causes the virtual machine instance and the sidecars to change execution states in the determined order. In some embodiments, the determined order may be relative to the virtual machine instance's change, and may not specify a particular order among the sidecars. For example, the sidecar lifecycle management unit 142 may determine that sidecars A and B should both change their execution states before the virtual machine instance does, but that it does not matter sidecar A's execution state change comes before or after sidecar B's. In other embodiments, the sidecar lifecycle management unit 142 may determine that one sidecar should change its execution state before another sidecar does so, and change the execution states accordingly.

The blocks of the routines described above may vary in embodiments of the present disclosure. For example, in some implementations of either routine, the sidecar configuration system 160 may be configured to implement additional functionality, such as generating and storing additional sidecars. Thus, the routines may include additional blocks, or the blocks of the routines may be rearranged, according to various embodiments.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a physical data store storing configuration information; and a computing device configured with executable instructions to:
receive a request to execute a task on an on-demand code execution system, the request including user-submitted code and identifying unprocessed data to be processed by the user-submitted code;
determine, based at least in part on the request, that a first virtual machine instance will be required to execute the user-submitted code and a second virtual machine instance will be required to pre-process the unprocessed data;
provision the first virtual machine instance;
configure the first virtual machine instance to:
receive processed data from the second virtual machine instance; and
execute the user-submitted code with the processed data;
provision the second virtual machine instance;
configure the second virtual machine instance to:
process the unprocessed data to form the processed data; and
transmit the processed data to the first virtual machine instance;
determine that the user-submitted code has completed execution on the first virtual machine instance; and
in response to the determination that the user-submitted code has completed execution, deprovision the first virtual machine instance and the second virtual machine instance.

2. The system of claim 1, wherein the second virtual machine instance performs at least one of validating, sanitizing, pre-processing, or scanning the unprocessed data to form the processed data.

3. The system of claim 1, wherein the computing device is further configured to cause the first virtual machine instance to transmit results of executing the user-submitted code with the processed data to a third virtual machine instance.

4. The system of claim 3, wherein the computing device is further configured to cause the third virtual machine instance to perform at least one of validating, sanitizing, post-processing, or scanning the results.

5. The system of claim 3, wherein the computing device is further configured to deprovision the third virtual machine instance in response to the determination that the user-submitted code has completed execution.

6. A computer-implemented method comprising:
receiving a request to execute user-submitted code to process input data on an on-demand code execution system;
obtaining, based at least in part on the request, information identifying a plurality of virtual machine instances to be used to process the request, wherein the plurality of virtual machine instances includes a first virtual machine instance to execute the user-submitted code to process pre-processed data generated from the input data, and a second virtual machine instances to process the input data to form the pre-processed data;
provisioning the first virtual machine instance of the plurality of virtual machine instances;
configuring the first virtual machine instance to:
receive the pre-processed data from the second virtual machine instance; and
execute the user-submitted code to further process the pre-processed data;
provisioning the second virtual machine instance of the plurality of virtual machine instances;
configuring the second virtual machine instance to process the input data to form the pre-processed data and to transmit the pre-processed data to the first virtual machine instance; and
in response to a determination that the first virtual machine instance has ended execution of the user-submitted code, deprovisioning the first virtual machine instance and the second virtual machine instance.

7. The computer-implemented method of claim 6, wherein deprovisioning the first virtual machine instance is further in response to a determination that the second virtual machine instance has finished processing the pre-processed data.

8. The computer-implemented method of claim 6 further comprising causing the first virtual machine instance to transmit processed data resulting from execution of the user-submitted to a third virtual machine instance of the plurality of virtual machine instances, wherein the third virtual machine instance is configured to conduct post-processing of the processed data.

9. The computer-implemented method of claim 8 further comprising provisioning the third virtual machine instance.

10. The computer-implemented method of claim 8, wherein the third virtual machine instance is a preexisting virtual machine instance, the method further comprising configuring the first virtual machine instance to transmit the processed data to the third virtual machine instance.

11. The computer-implemented method of claim 10 further comprising deconfiguring the third virtual machine in response to the determination that the first virtual machine instance has ended execution of the user-submitted code.

12. The computer-implemented method of claim 8 further comprising deprovisioning the third virtual machine instance in response to one or more of:
the determination that the first virtual machine instance has ended execution of the user-submitted code; or
a determination that the third virtual machine instance has transmitted conducted the post-processing on all of the processed data.

13. The computer-implemented method of claim 6 further comprising determining, based at least in part on the request, the information identifying the plurality of virtual machines.

14. Non-transitory computer-readable media including computer-executable instructions that, when executed on an on-demand code execution system, cause the on-demand code execution system to:
receive a request to execute user-submitted code to process input data;
obtain, based at least in part on the request, configuration information identifying a plurality of virtual machine instances to be used to process the request, wherein the plurality of virtual machine instances includes a first virtual machine instance to execute the user-submitted code to process pre-processed data generated from the input data, and a second virtual machine instances to process the input data to form the pre-processed data;
configure a first virtual machine instance of the plurality of virtual machine instances to receive the pre-processed data from the second virtual machine instance and to execute the user-submitted code to further process the pre-processed data;
configure the second virtual machine instance of the plurality of virtual machine instances to process the input data to form the pre-processed data and to transmit the pre-processed data to the first virtual machine instance; and in response to a determination that the first virtual machine instance has ended execution of the user-submitted code, deconfigure the first virtual machine instance and the second virtual machine instance.

15. The non-transitory computer-readable media of claim 14 wherein the instructions further cause the on-demand code execution system to provision the first virtual machine instance.

16. The non-transitory computer-readable media of claim 14 wherein the instructions further cause the on-demand code execution system to determine that the first virtual machine instance has ended execution of the user-submitted code.

17. The non-transitory computer-readable media of claim 14, wherein the instructions cause the on-demand code execution system to configure the second virtual machine instance to transmit input to and receive output from the first virtual machine instance.

18. The non-transitory computer-readable media of claim 14, wherein the second virtual machine instance is reset to a default configuration in response to the determination that the first virtual machine instance has ended execution of the user-submitted code.

19. The non-transitory computer-readable media of claim 14, wherein the first virtual machine instance is reset to a default configuration in response to the determination that the first virtual machine instance has ended execution of the user-submitted code.

* * * * *